(12) United States Patent
Bloom

(10) Patent No.: US 7,549,759 B2
(45) Date of Patent: Jun. 23, 2009

(54) MICRO-ELECTROMECHANICAL LIGHT MODULATOR WITH ENHANCED CONTRAST

(75) Inventor: David M. Bloom, Jackson, WY (US)

(73) Assignee: Alces Technology, Inc., Jackson, WY (US)

(*) Notice: Subject to any disclaimer, the term of this patent is extended or adjusted under 35 U.S.C. 154(b) by 356 days.

(21) Appl. No.: 11/512,036

(22) Filed: Aug. 28, 2006

(65) Prior Publication Data

US 2008/0062521 A1    Mar. 13, 2008

(51) Int. Cl.
*G02B 7/182* (2006.01)
(52) U.S. Cl. .................. 359/850; 359/298; 359/496; 359/847
(58) Field of Classification Search .......... None
See application file for complete search history.

(56) References Cited

U.S. PATENT DOCUMENTS

| | | | |
|---|---|---|---|
| 5,311,360 A | 5/1994 | Bloom | |
| 5,841,579 A | 11/1998 | Bloom | |
| 5,982,553 A | 11/1999 | Bloom | |
| 6,707,595 B2 * | 3/2004 | Kutz et al. | 359/291 |
| 7,054,051 B1 | 5/2006 | Bloom | |

* cited by examiner

*Primary Examiner*—Stephone B Allen
*Assistant Examiner*—Derek S Chapel
(74) *Attorney, Agent, or Firm*—Nupat, LLC; Morrison Ulman

(57) ABSTRACT

A system and method for increasing contrast in displays using micromechanical light modulators. Contrast is enhanced by an optical system that uses polarization to discriminate unmodulated light. Contrast obtained from polarization sensitive components of an optical system has a multiplicative effect on contrast already available.

16 Claims, 6 Drawing Sheets

MICRO-ELECTROMECHANICAL LIGHT MODULATOR WITH ENHANCED CONTRAST

TECHNICAL FIELD

The disclosure relates generally to visual display systems. In particular it relates to apparatus and methods for increasing contrast in displays using micro-electromechanical (MEMS) light modulators.

BACKGROUND

Display devices such as television sets and movie projectors often incorporate a modulator for the purpose of distributing light into a two-dimensional pattern or image. For example, the frames of a movie reel modulate white light from a projector lamp into shapes and colors that form an image on a movie screen. In modern displays light modulators are used to turn on and off individual pixels in an image in response to electronic signals that control the modulator.

A class of MEMS light modulators was introduced in 1994 in U.S. Pat. No. 5,311,360. These devices, generally known as "grating light modulators", modulate light by diffraction from optical gratings that are formed by mechanical ribbons. The ribbons move small distances very quickly and the gratings formed by them appear or disappear rapidly.

Approximately 250 subsequent patents refer to the '360 patent and disclose various applications, refinements and improvements to the basic grating light modulator design. Displays based on one-dimensional arrays of grating light modulators as disclosed in U.S. Pat. No. 5,982,553, for example, have met with success in the marketplace.

A new class of MEMS light modulators that incorporate ribbon structures, but use interferometric rather than diffractive optics, was introduced in 2006 in U.S. Pat. No. 7,054,051. These devices, generally known as "polarization light modulators" operate by phase shifting polarization components of light in an interferometer.

A characteristic of visual displays is contrast, or the intensity ratio of the brightest and darkest states of a display. A high contrast display can show images which contain both bright and dark pixels. Contrast improves the appearance of a display to a human observer because the human visual system can perceive variations in brightness over many orders of magnitude.

Displays incorporating MEMS light modulators sometimes encounter difficulty achieving high contrast; e.g. displaying black areas in an image. Therefore a MEMS light modulator-based display with improved contrast would be highly desirable.

BRIEF DESCRIPTION OF THE DRAWINGS

The drawings are heuristic for clarity.

DETAILED DESCRIPTION

Figure 1A:
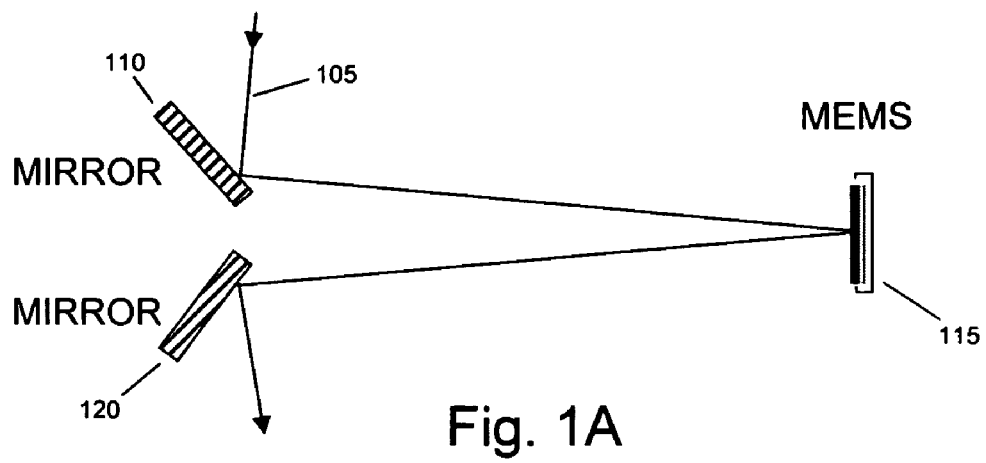
FIGS. 1A and 1B show a MEMS light modulator and turning mirrors that direct input and output light.

MEMS light modulators are optical components that manipulate the amplitude or phase of light beams. Such modulators are often used in visual display systems. A subset of MEMS light modulators incorporates mechanical ribbon structures and many of these modulators may be classified as either interferometric or diffractive.

Examples of interferometric light modulators include the polarization light modulators disclosed in U.S. Pat. No. 7,054,051, and in U.S. patent applications Ser. No. 11/161,452 filed on Aug. 3, 2005 and Ser. No. 11/336,277 filed on Jan. 20, 2006, all incorporated herein by reference. Examples of diffractive light modulators include various grating light modulator designs such as those disclosed in U.S. Pat. Nos. 5,311,360, 5,841,579 and 5,982,553.

A polarization light modulator is an interferometric MEMS device that modulates light by dividing it into polarization components and imparting a relative phase shift to the components before recombining them. When the phase shifted polarization components are recombined the net effect is to transform the polarization of the light. Controllable polarization transformation analyzed by polarization sensitive optics is the basis for light modulation.

A grating light modulator (GLM) is a diffractive MEMS device that modulates light incident upon an optical grating. Unlike a conventional grating, however, the grating in a GLM is formed by tiny, movable MEMS ribbon structures. Therefore the grating in a GLM can be turned "on" and "off". In the "on" state a GLM diffracts light like a conventional grating while in the "off" state the GLM reflects light like a mirror.

Many different MEMS ribbon arrangements have been designed for polarization and grating light modulators and each has its own unique properties. Variations include spacing ribbons close together or far apart from their neighbors. Some designs use ribbons arrays of alternating ribbon stiffness. This can be achieved by supporting alternating ribbons with different support structures. For example U.S. patent application Ser. No. 11/336,277 filed on Jan. 20, 2006 discloses ribbons with additional supports placed between the end supports.

To appreciate the size scale corresponding to MEMS ribbon structures it may be helpful to consider that many MEMS light modulators use ribbons approximately 50~200 µm long, approximately 2~10 microns wide and approximately 0.05~1 microns thick. These MEMS ribbons can be deflected very rapidly over small distances by electric fields. For example, a typical ribbon can be deflected at its midpoint by approximately 200 nm in approximately 100 nanoseconds. A linear array of ribbons may contain as many as several thousand ribbons.

The high switching speed of MEMS ribbon structures makes them compatible with digital imaging techniques and permits a scanned line image from a linear array MEMS light modulator to appear as a two dimensional image to a human observer. A MEMS light modulator switches on and off quickly enough to give the impression of gray scale and this action is repeated for each pixel in a line within the oscillation period of a scan mirror.

Contrast in a MEMS light modulator can be enhanced by an optical system that uses polarization to discriminate unmodulated light. In a diffractive modulator, polarization may be used as an extra degree of freedom to differentiate between modulated and unmodulated pixels. Contrast from polarization sensitive components of an optical system has a multiplicative effect on contrast already available. Proper arrangement of polarization-manipulating optical elements results in an immediate "drop-in" improvement to contrast in a diffractive MEMS modulator.

Contrast improvement may be obtained by adding a polarization displacement device (PDD) to an optical system surrounding a MEMS ribbon device in a display. A polarization displacement device (e.g. a Savart plate) divides an incoming light beam into polarization components and shifts or displaces those components in a direction perpendicular to the direction of propagation. The input to the PDD is a polarized light beam; the output is two orthogonally polarized light beams spatially separated from one another, but still propagating parallel to each other.

In a MEMS light modulator system, a PDD may be inserted between the light source and the MEMS ribbon structure. Furthermore, the PDD may be engineered such that the amount of displacement of the orthogonally polarized output beams matches the period of the light modulating surfaces. This is the period of ribbons in a closely spaced ribbon array or half the period of ribbons in a "ribbon-gap" array such as that described in U.S. Pat. No. 5,311,360.

Regardless of whether a MEMS light modulator is operating in a diffractive or interferometric mode, ribbons in the modulator impart phase shifts to light reflected by them. A PDD may be inserted into the modulator system so that orthogonal polarization components of light are reflected by alternating ribbons (or ribbon and gap surfaces). When this light is recombined in the PDD the overall polarization of the light is transformed with respect to the incoming polarization. The degree of transformation is proportional to the relative phase shift between the polarization components.

A polarizer may be inserted in the light output from the MEMS light modulator after the PDD to differentiate between modulated and unmodulated light. This additional discrimination improves contrast even in diffractive MEMS light modulators. A polarization light modulator may use the same principle without the need for a polarizing beam splitter if light travels to and from the modulator's MEMS ribbon device at angles slightly away from the normal to the ribbons' surface.

Figure 1B:
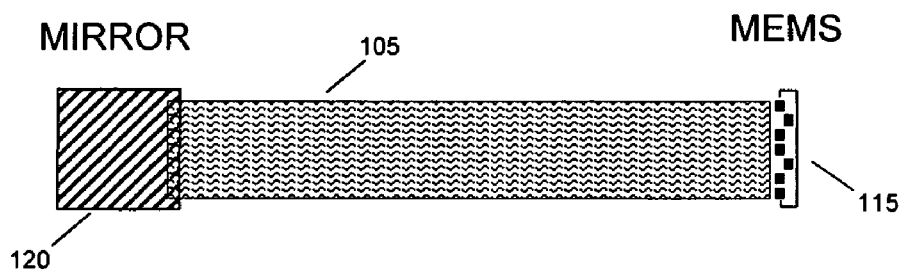

FIGS. 1A and 1B show a MEMS light modulator and turning mirrors that direct input and output light. In FIG. 1A light beam 105 is reflected by mirror 110 before illuminating MEMS ribbon device 115. The light then travels toward, and is reflected by, mirror 120. Mirrors 110 and 120 allow input and output light to travel to and from the MEMS ribbon device at angles slightly away from the normal to the ribbons' surface. Therefore no beam splitter is needed to separate input and output light.

FIG. 1B is a view of the system shown in FIG. 1A from a perspective lying in the plane of FIG. 1A. Mirror 110 is not shown in FIG. 1B because it lies behind mirror 120. Light beam 105 appears as a wide stripe in this perspective because it illuminates all the ribbons in MEMS device 115. In FIG. 1A the long axes of ribbons in MEMS device 115 are parallel to the plane of the figure, while in FIG. 1B the long axes of the ribbons are perpendicular to the plane of the figure. Other optical components that might be included in a light modulator system, such as lenses, stops, prisms or polarizers, are not shown in FIG. 1A or 1B.

Figure 2:
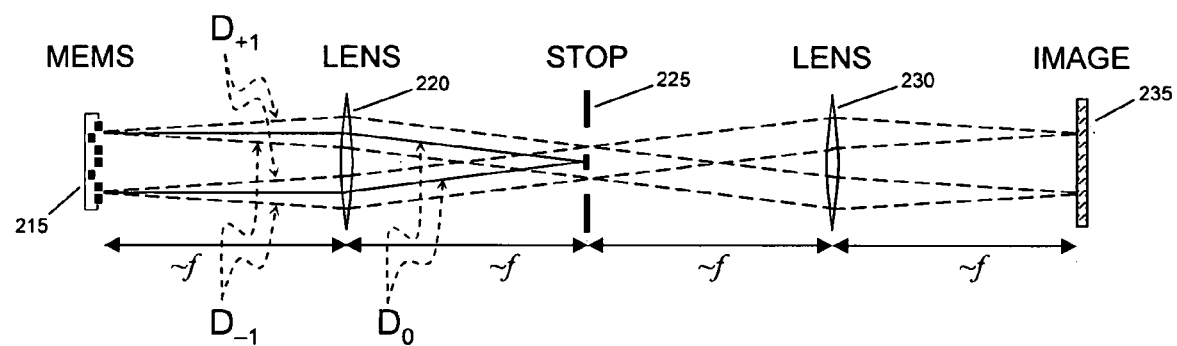
FIG. 2 shows a simplified diffractive MEMS light modulator optical system.

FIG. 2 shows a simplified diffractive MEMS light modulator optical system. In the system diffracted orders from a MEMS grating are imaged to a Fourier plane where zero order reflected light is blocked by a stop. In FIG. 2 diffractive MEMS device 215 is oriented such that the long axes of its ribbons are perpendicular to the plane of the figure. Lens 220 is placed approximately one focal length, f, away from MEMS device 215. Stop 225 is placed approximately one focal length, f, away from lens 220 on the opposite side of the lens from MEMS device 215. Lens 230 is placed approximately one focal length, f, away from stop 225 and image 235 is formed approximately one focal length, f, away from lens 230 on the opposite side from stop 225.

Light rays that are reflected or diffracted by MEMS device 215 are drawn as solid and dashed lines respectively. Reflected light rays are marked "$D_0$" while plus and minus first order diffracted rays are marked "$D_{+1}$" and "$D_{-1}$" respectively. Stop 225 contains opaque regions and apertures. Reflected rays ("$D_0$") are blocked by stop 225 while diffracted rays ("$D_{+1}$" and "$D_{-1}$") pass through apertures in the stop and form an image 235. Therefore image 235 is formed by diffracted, rather than reflected, light. Unmodulated light that arrives at image 235, for example via scattering, is detrimental to the contrast of the system. However, if the system is constructed such that modulated and unmodulated light have different polarizations, then a polarizer may be used to further improve contrast.

In the simplified system of FIG. 2, lenses 220 and 230 share the same focal length, f, but that is not a requirement of an actual system. Furthermore, lenses 220 and 230, and stop 225 may be replaced by curved mirrors, for example in an Offner relay. Image 235 is a line image; it may be scanned by an oscillating mirror to form a two-dimensional image.

Figure 3A:
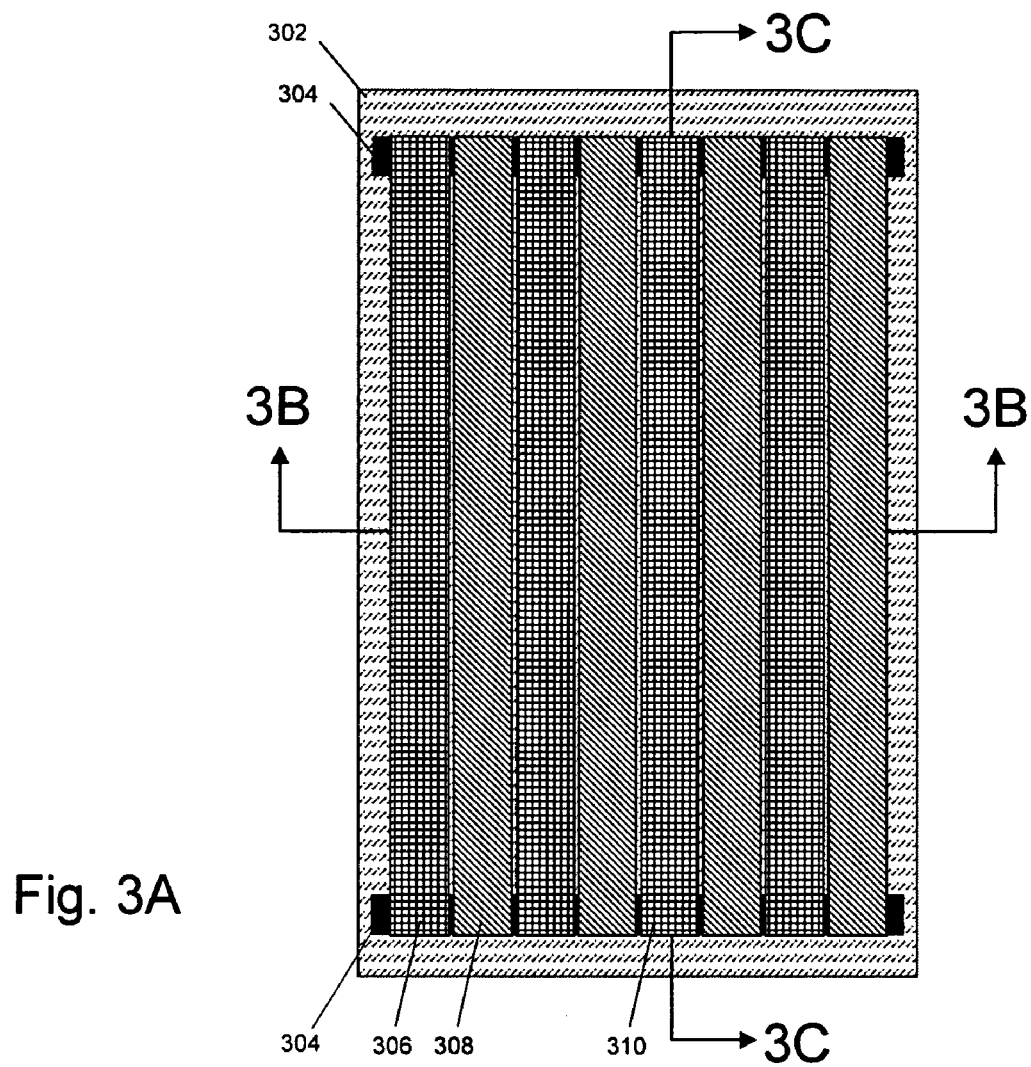
FIGS. 3A-3C show a simplified MEMS ribbon device.
Figure 3B:
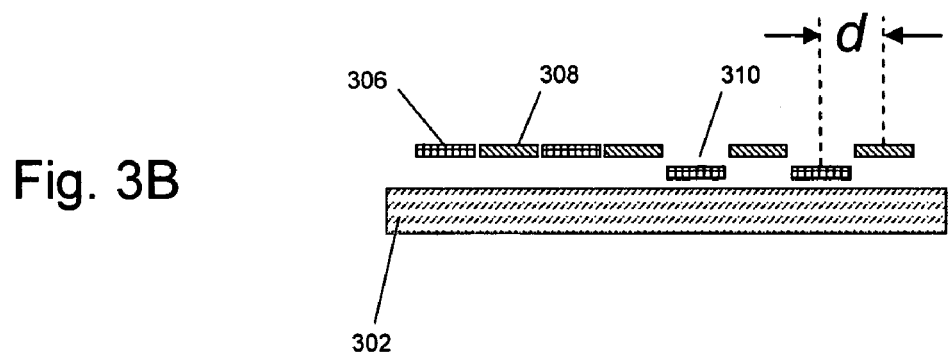
Figure 3C:
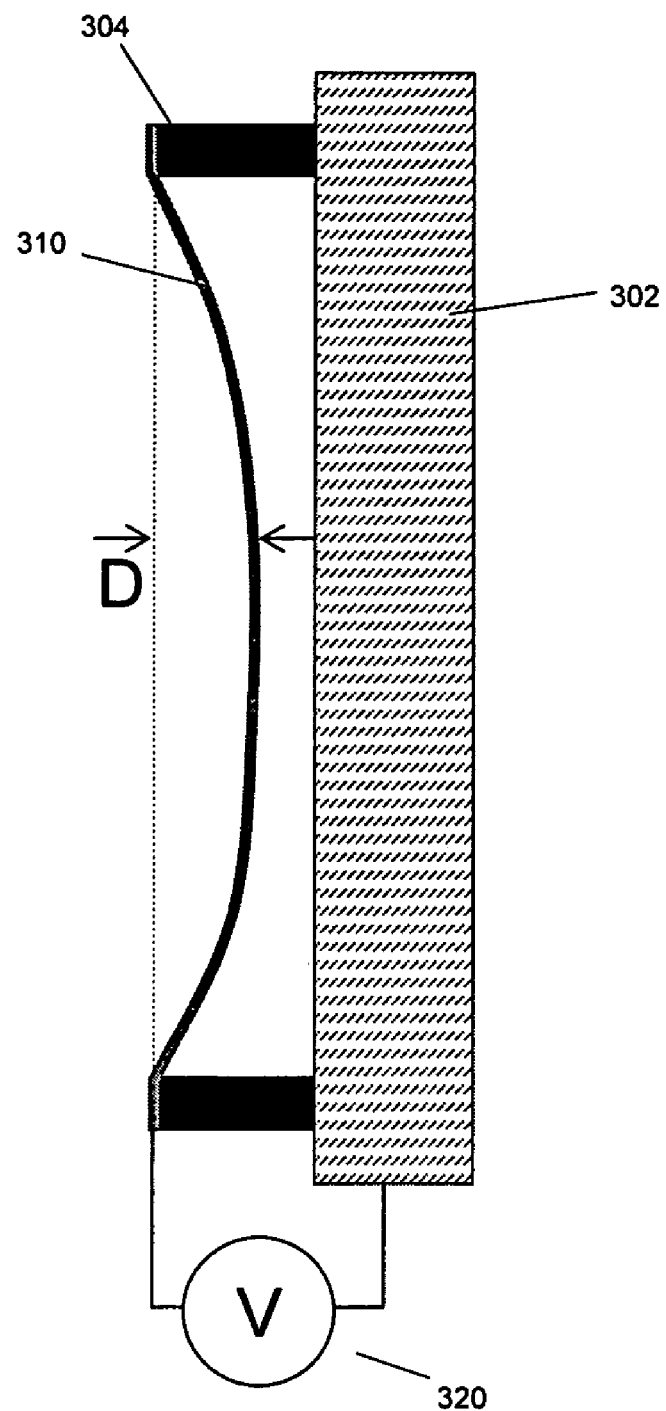

FIGS. 3A-3C show a simplified MEMS ribbon device. Ribbon devices similar to that shown in FIGS. 3A-3C may be used in interferometric or diffractive light modulators. FIGS. 3A-3C are intended to represent the common features of many different variations of MEMS ribbon device including devices illustrated and described in U.S. Pat. Nos. 5,311,360, 5,841,579, 5,982,553, and 7,054,051, and in U.S. patent applications Ser. No. 11/161,452 filed on Aug. 3, 2005 and Ser. No. 11/336,277 filed on Jan. 20, 2006, each of which is incorporated herein by reference. Variations in MEMS ribbon device design include: ribbons spaced apart by as much as one ribbon width, alternating supported ribbons, ribbons of alternating stiffness, ribbons supported at points intermediate between end supports, ribbons tilted at a blaze angle, etc. However all of these device designs share features such as: long, thin ribbons, at least some of which are deflectable toward a substrate; electrostatic ribbon deflection; reflective ribbon surfaces; and, fabricated using MEMS techniques.

FIGS. 3A-3C do not illustrate the aspect ratios (e.g. the ratio of ribbon length to ribbon width) of actual ribbon devices. In the simplified MEMS ribbon device of FIG. 3A item 302 is a substrate such as a silicon or glass wafer. Ribbons, such as ribbons 306, 308 and 310 are supported at their ends by support structures 304. Depending on the application of the MEMS ribbon device, additional ribbon supports may be placed between end support structures 304. In FIG. 3A only eight ribbons are shown for simplicity; however an actual device may comprise thousands of ribbons. FIG. 3B is a cross sectional view of the device of FIG. 3A.

In FIG. 3B some ribbons (e.g. 306, 308) are depicted in their undeflected state while others (e.g. 310) are shown deflected toward substrate 302. FIG. 3C is a cross sectional view of the device of FIG. 3A. In FIG. 3O a voltage source 320 applies a voltage between ribbon 310 and substrate 302. The voltage causes ribbon 310 to deflect toward substrate 302 by a distance D. In many MEMS light modulator designs, the distance D by which ribbons are deflected toward a substrate is approximately equal to a quarter wavelength of the light being modulated. The structures shown in FIGS. 3A-3C may be fabricated with MEMS microfabrication techniques including, for example, those described in U.S. Pat. No. 5,311,360, 5,841,579 or 7,054,051. The optical principles and systems disclosed herein are also appropriate for MEMS modulators using cantilever rather than ribbon structures as optical phase shift surfaces.

Figure 4A:
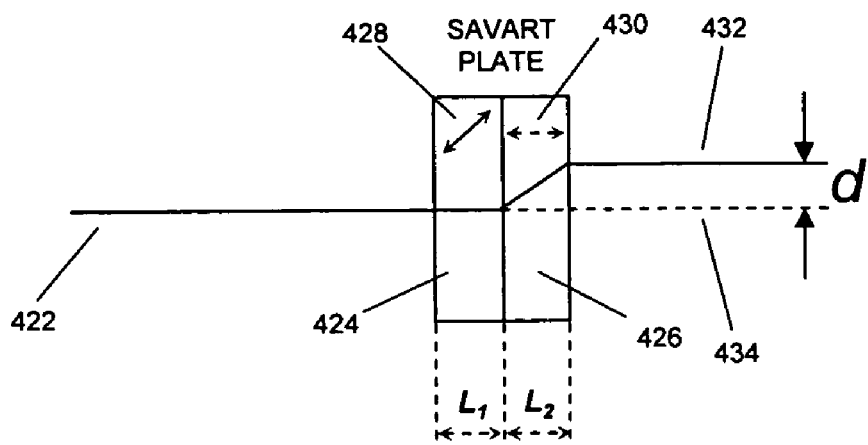
FIGS. 4A and 4B show a Savart plate and a generalized polarization displacement device, respectively.
Figure 4B:
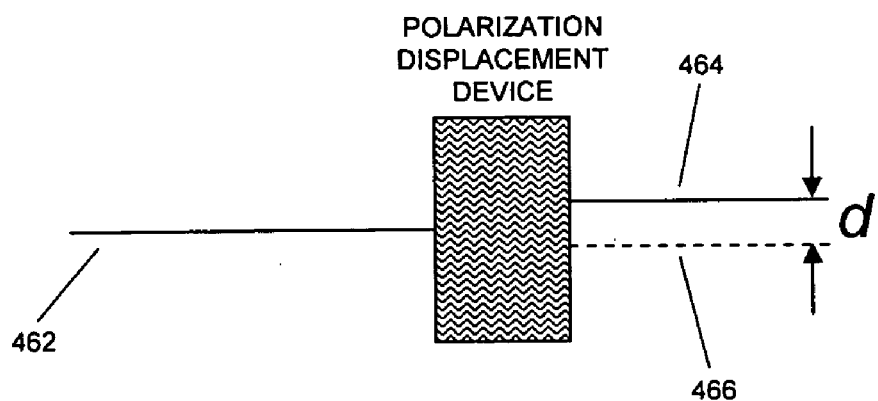

FIGS. 4A and 4B show a Savart plate and a generalized polarization displacement device, respectively. A Savart plate is an example of a walkoff crystal which imparts lateral displacement on polarization components of light incident upon it. In FIG. 4A input light beam 422 is divided into orthogonally polarized components 432 and 434. The Savart plate is composed of two pieces of material 424 and 426 with optic axes oriented as shown by arrows 428 and 430. Arrow 430 is dashed to indicate that it does not lie in the plane of the page; in fact, it forms a 45 degree angle with the plane of the page.

Distances $L_1$ and $L_2$ indicate that thicknesses in the Savart plate vary the properties of light beams 432 and 434. These thicknesses can be designed to specify the set point of an interferometer. Additionally, the plate can be tilted in the plane of the paper (i.e. about an axis perpendicular to the plane of the paper). Tilt can be used to make small adjustments in the separation distance, d. This degree of freedom is helpful when matching polarization displacement to the distance from one ribbon to an adjacent ribbon (or gap surface) in a MEMS ribbon device.

In general any device can be used as a polarization displacement device as long as it has the effect shown in FIG. 4B. An incoming light beam 462 is separated into two parallel light beams 464 and 466 which are polarized orthogonal to one another. Equivalently, if polarized light beams 464 and 466 are considered the input, then the device combines them into one beam 462. The polarization of beam 462 is then determined by the relative phase of the polarization components of beams 464 and 466.

As described in U.S. Pat. No. 7,054,051, and in U.S. patent applications Ser. No. 11/161,452 filed on Aug. 3, 2005 and Ser. No. 11/336,277 filed on Jan. 20, 2006, a polarization displacement device may be made from: a Wollaston, Rochon or Senarmont prism in combination with a lens; a Savart plate or a modification thereof; or, any other optical components which have the same effect.

Figure 5A:
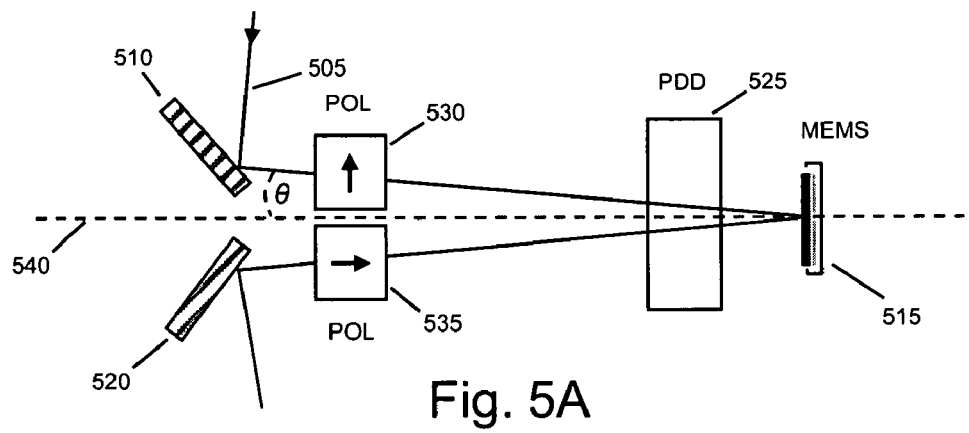
FIGS. 5A and 5B show an optical system incorporating a MEMS light modulator, a polarization displacement device, and polarizing elements.
Figure 5B:
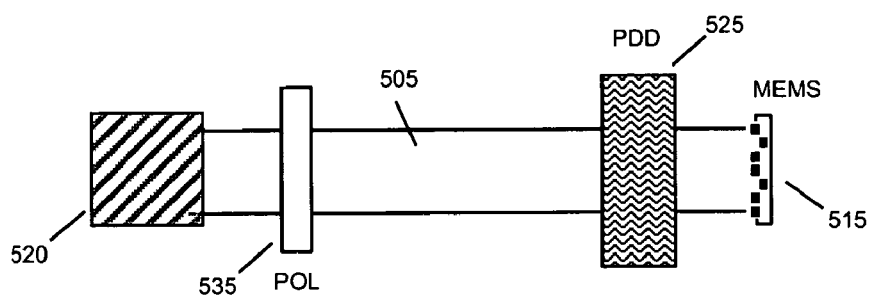

FIGS. 5A and 5B show an optical system incorporating a MEMS light modulator, a polarization displacement device, and polarizing elements. In FIG. 5A light beam 505 is reflected by mirror 510 before passing through polarizer 530 and polarization displacement device (for example, a Savart plate) 525 and illuminating MEMS ribbon device 515. Upon reflection from MEMS device 515 the beam passes through PDD 525 and polarizer 535 before being reflected by mirror 520. Mirrors 510 and 520 allow input and output light to travel to and from the MEMS ribbon device at angles slightly away from the normal to the ribbons' surface. Therefore no beam splitter is needed to separate input and output light.

FIG. 5B is a view of the system shown in FIG. 5A from a perspective lying in the plane of FIG. 5A. Mirror 510 is not shown in FIG. 1B because it lies behind mirror 520. Similarly polarizer 530 is not shown in FIG. 5B. Light beam 505 appears as a wide stripe in this perspective because it illuminates all the ribbons in MEMS device 515. In FIG. 5A the long axes of ribbons in MEMS device 515 are parallel to the plane of the figure, while in FIG. 5B the long axes of the ribbons are perpendicular to the plane of the figure. Other optical components that might be included in a light modulator system, such as additional mirrors, lenses and, stops are not shown in FIG. 5A or 5B.

The system of FIGS. 5A and 5B offers improved contrast when used with a diffractive MEMS light modulator. Alternatively the optical system may be used with a polarization light modulator without the need for a polarizing beam splitter to separate input and output light beams. Light travels to and from MEMS ribbon device 515 at a small angle, θ, slightly away from the normal 540 to the ribbons' surface. θ may be any angle from a fraction of a degree up to a few degrees.

If input light beam 505 is unpolarized, or only partially polarized, then polarizer 530 serves to linearly polarize the beam. However, if the input light beam comes from a polarized source, such as a laser, then polarizer 530 is not necessary as the beam is already polarized. Further, if polarizer 530 is necessary, it may be placed anywhere before PDD 525; it could be inserted before mirror 510 for example. Polarizer 535 serves to analyze light coming from PDD 525. Polarizer 535 is oriented so that its polarization axis is 90 degrees away from that of polarizer 530. It may be placed anywhere after PDD 525 in the path of light beam 505; it does not need to be before mirror 520. Polarizers 530 (if used) and 535 may be polarizing beam splitters, micro wire grid polarizers, or any other type of polarizer.

In the system illustrated in FIG. 5 polarized input light travels through polarization displacement device 525. PDD 525 splits the incoming beam into two orthogonally polarized beams displaced from one another perpendicular to the direction of propagation as illustrated in the case of a Savart plate in FIG. 4A. These light beams then strike MEMS device 515 which has the general design illustrated in FIGS. 3A-3C; i.e. long, thin ribbons, at least some of which are deflectable toward a substrate; electrostatic ribbon deflection; reflective ribbon surfaces; and, fabricated using MEMS techniques. The PDD is designed such that the amount of lateral displacement, d (as shown in FIG. 4A) matches the ribbon period, d (as shown in FIG. 3B). (In some MEMS ribbon devices, such as those described in U.S. Pat. No. 5,311,360, the displacement should be matched to one-half the ribbon period since the gap area between ribbons is used as a reflective surface.)

When a ribbon is deflected (as illustrated schematically by ribbon 310 in FIGS. 3B and 3C) in either a diffractive MEMS modulator system or a polarization light modulator system, it imparts a relative phase shift to the two orthogonally polarized beams coming from PDD 525. The phase shifted light beams are then recombined in PDD 525. At this point the polarization of the combined light beam is transformed compared to the polarization of the input light beam by an amount proportional to the phase shift. When a ribbon is deflected by an amount, D (as shown in FIG. 3C), equal to one quarter wavelength of the light being modulated, then the polarization of light exiting the PDD is rotated 90 degrees away from the polarization of the input light beam. The polarization axis of polarizer 535 is also rotated 90 degrees away from the polarization of the input light beam. Therefore polarizer 535 passes light reflected by deflected ribbons (i.e. modulated pixels) and rejects light reflected by undeflected ribbons (i.e. unmodulated pixels).

If the light modulator of FIGS. 5A and 5B is a diffractive light modulator, the addition of polarized optics just described enhances the contrast that is already achieved, for example by stop 225 in the optical system shown in FIG. 2. Polarization displacement device 525 and polarizers 530 (if necessary) and 535 provide a "drop-in" contrast improvement.

Alternatively, if the light modulator of FIGS. 5A and 5B is a polarization light modulator, then the figures show that polarization light modulators, such as those described in U.S. patent application Ser. No. 11/336,277 filed on Jan. 20, 2006, can be constructed without a polarizing beam splitter to separate input and output light. Rather, the input and output light beams can be separated by a small angle (e.g. angle θ in FIG. 5A) away from the normal to the surface of ribbons in a MEMS ribbon device.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A polarization light modulator comprising:
 a polarization displacement device;
 a micro-electromechanical system (MEMS ribbon device; and,
 a polarizer; wherein,
  the polarizer passes light that has propagated through the polarization displacement device after being reflected by deflected ribbons in the MEMS ribbon device.

2. The modulator of claim 1 wherein the polarizer rejects light that has propagated through the polarization displacement device after being reflected by undeflected ribbons in the MEMS ribbon device.

3. The modulator of claim 1 wherein the polarization displacement device is a Savart plate.

4. The modulator of claim 1 wherein the polarizer is a micro wire grid polarizer.

5. A diffractive light modulator comprising:
 a polarization displacement device;
 a micro-electromechanical system (MEMS ribbon device; and,
 a polarizer; wherein,
  the polarizer passes light that has propagated through the polarization displacement device after being diffracted by the MEMS ribbon device.

6. The modulator of claim 5 wherein the polarizer rejects light that has propagated through the polarization displacement device after being reflected by undeflected ribbons in the MEMS ribbon device.

7. The modulator of claim 5 wherein the polarization displacement device is a Savart plate.

8. The modulator of claim 5 wherein the polarizer is a micro wire grid polarizer.

9. A polarization light modulator comprising:
 a polarization displacement device;
 a micro-electromechanical system (MEMS) ribbon device; and,
 a polarizer; wherein,
  an input light beam is divided into two light beams of orthogonal polarization by the polarization displacement device;
  the two light beams of orthogonal polarization arrive at the MEMS ribbon device at a small angle to the normal of the surface of ribbons in the device;
  the MEMS ribbon device imparts a relative phase shift on the two light beams of orthogonal polarization;
  the two light beams of orthogonal polarization are recombined in the polarization displacement device into an output light beam that is analyzed by the polarizer; and,
  the polarization light modulator does not comprise a beam splitter to separate input and output light.

10. The modulator of claim 9 wherein the polarization displacement device is a Savart plate.

11. The modulator of claim 9 wherein the polarizer is a micro wire grid polarizer.

12. A light modulator comprising:
 a micro-electromechanical system (MEMS) ribbon device;
 a stop that blocks zero order light reflected by the MEMS ribbon device while passing first order light diffracted by the MEMS ribbon device; and,
 polarization sensitive optics that discriminate on the basis of polarization between zero order light reflected by the MEMS ribbon device and first order light diffracted by the MEMS ribbon device.

13. The light modulator of claim 12 wherein the polarization sensitive optics comprise a polarization displacement device.

14. The light modulator of claim 13 wherein the polarization displacement device is a Savart plate.

15. The light modulator of claim 13 wherein the polarization sensitive optics further comprise a polarizer.

16. The light modulator of claim 15 wherein the polarizer is a micro wire grid polarizer.

* * * * *